Figure 1:
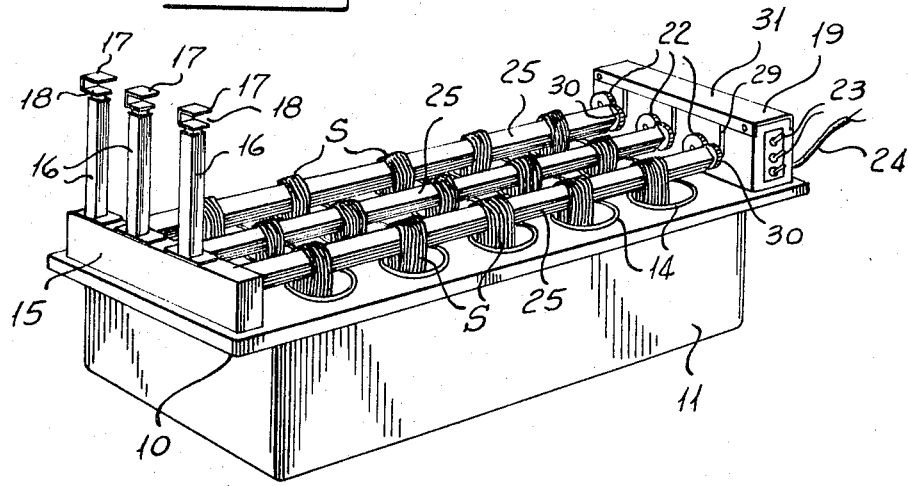

June 6, 1967  L. A. GRAZIANO  3,323,337
DYE TESTING APPARATUS
Filed July 2, 1965  3 Sheets-Sheet 1

INVENTOR.
LAWRENCE A. GRAZIANO,
BY
Robert F. Beck
ATTORNEY

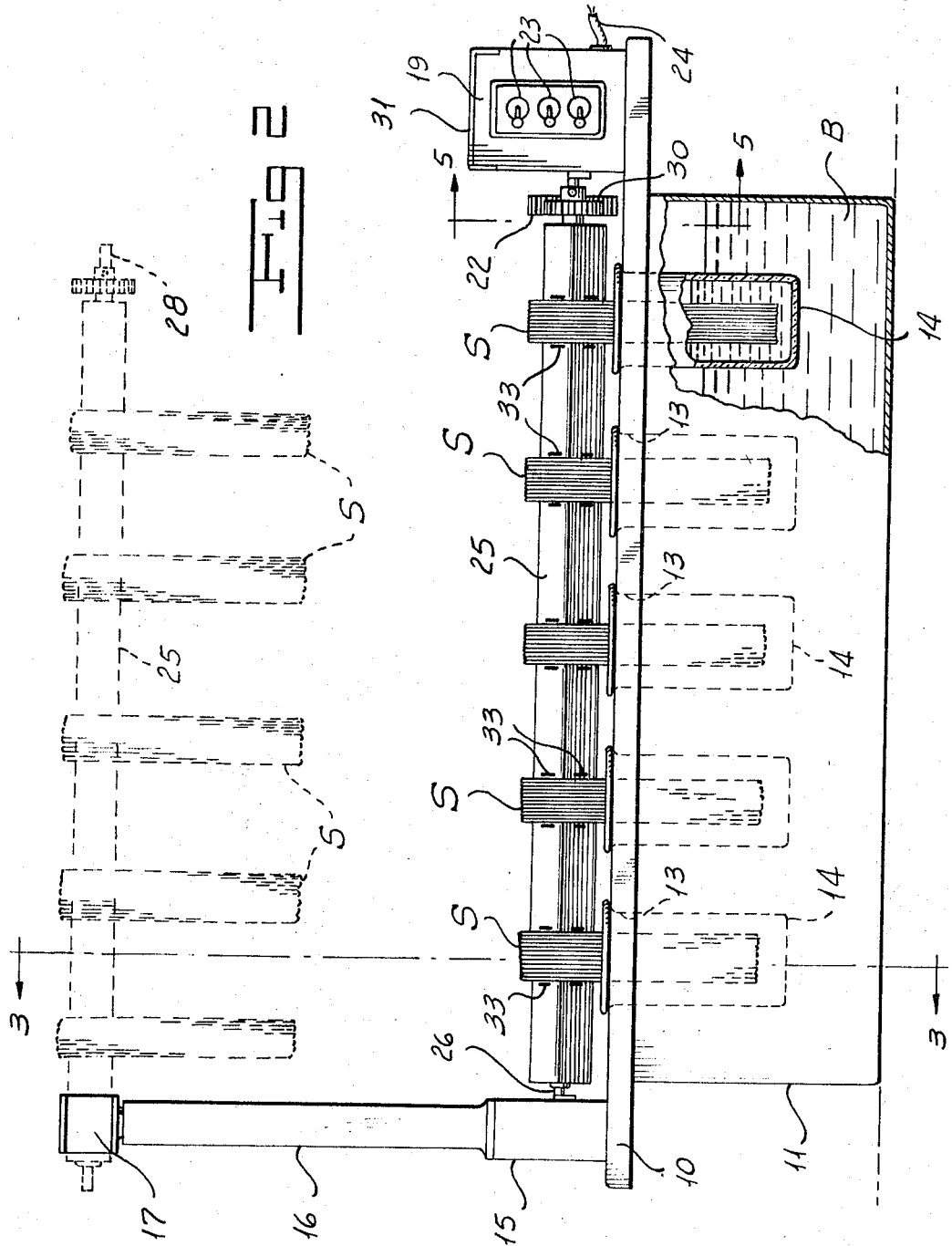

June 6, 1967 L. A. GRAZIANO 3,323,337
DYE TESTING APPARATUS
Filed July 2, 1965 3 Sheets-Sheet 3
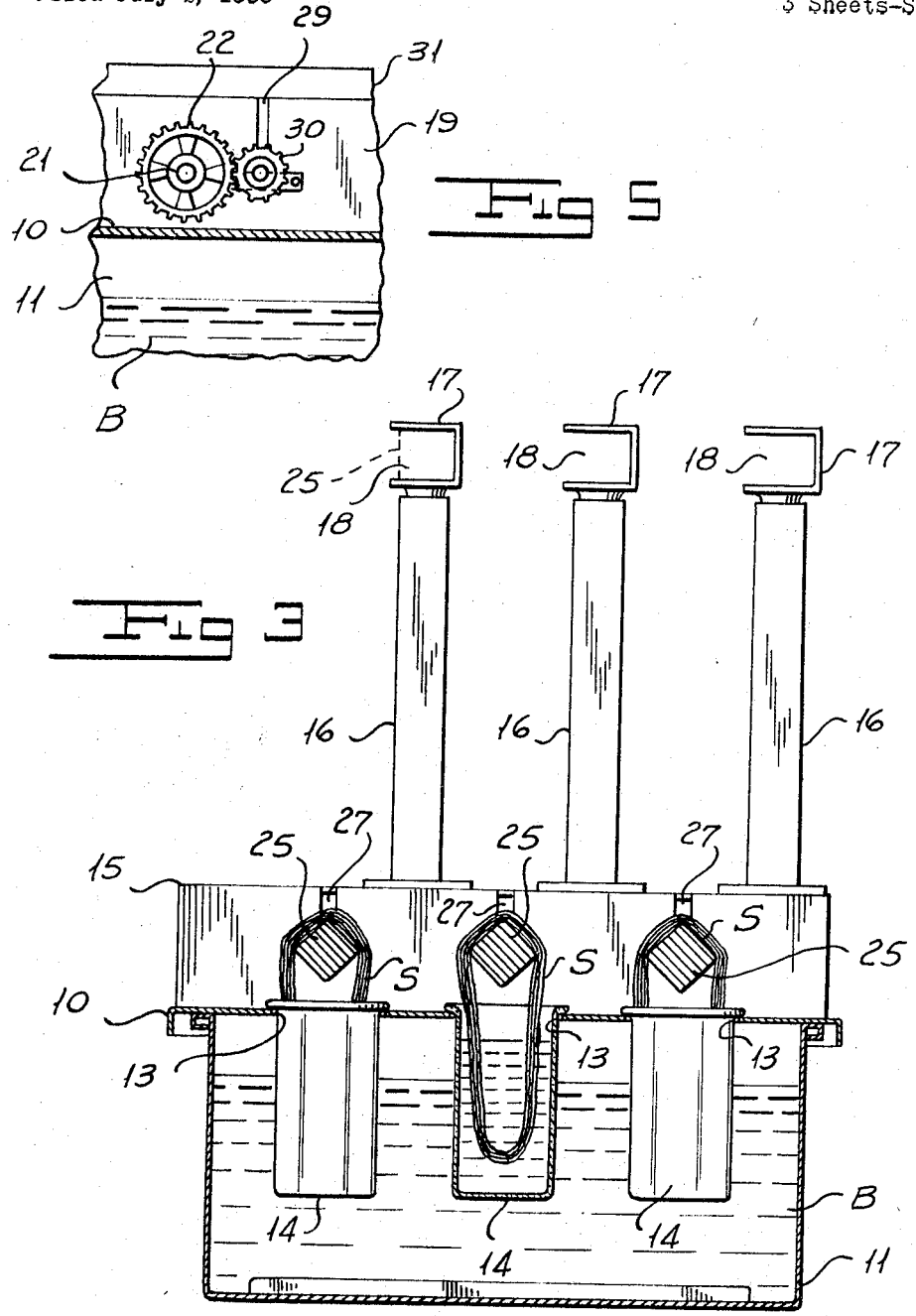

United States Patent Office 3,323,337
Patented June 6, 1967

3,323,337
DYE TESTING APPARATUS
Lawrence A. Graziano, 33 Newton Road,
Wayne, N.J. 07470
Filed July 2, 1965, Ser. No. 469,235
4 Claims. (Cl. 68—27)

The present invention relates to dyeing and more particularly to dye testing apparatus for accurately determining shades of various colors for comparison with preestablished color standards or the like, an example of the prior art being disclosed in United States Patent No. 2,072,323.

In the dye industry, it is frequently necessary to accurately match the shade of a selected color of textile material to be dyed with the identical shade of previous dyed material or to provide a shade in accordance with a preselected shade of an established standard or prototype. In order to obtain the desired shade, a plurality of hanks or skeins of yarn of undyed material are passed through solutions of various shades of the color a number of times for predetermined periods and then removed, dried and compared with the standard for evaluation, to thus enable a solution to be mixed having the correct or matching shade as the prototype.

Heretofore, the methods employed for testing has often proven unsatisfactory for various reasons, for instance, variations in the shades obtained by the skeins at different times due to inconstant travel through the solutions and the relatively long periods required in arranging the skeins not only for their immersion in the solutions but also for their travel therethrough. My invention overcomes the foregoing disadvantages and others of the prior art, it being one of the objects of my invention to provide dye testing apparatus constructed and arranged in a manner wherein the skeins may be quickly and correctly positioned for immersion in the solutions contained in breakers previous to testing.

Another object of my invention is to provide an apparatus of the foregoing described character equipped with means for effecting travel of the skeins through the solutions at uniform and constant speeds.

A further object of my invention is to provide an apparatus of the foregoing described character, wherein the skeins are initially suspended on rotating means above the breakers and which means is lowered to dispose the skeins within the solutions contained in the breakers for travel therethrough.

A still further object of my invention is to provide an apparatus of the foregoing described character, wherein a minimum of solutions may be used to thereby preclude undue waste of dye solutions.

Another important object of my invention is to provide an apparatus of the foregoing described character which is simple in construction, durable in use, efficient in operation, and economic in manufacture.

Briefly stated, my invention comprises means whereby a series of skeins may be employed and passed through dye baths or solutions of different shades of color contained in breakers and then removed and dried for comparison with a standard for evaluation to thus enable a solution to be correctly mixed in a dye jigger or the like for dyeing of textile material of a preselected shade of color.

With the above and other objects in view, as will hereinafter appear, the invention consists in the combination and arrangement of parts hereinafter set forth and illustrated in the accompanying drawings from which the several features of the invention and the advantages attained thereby will be readily understood by those skilled in the art.

Figure 4:
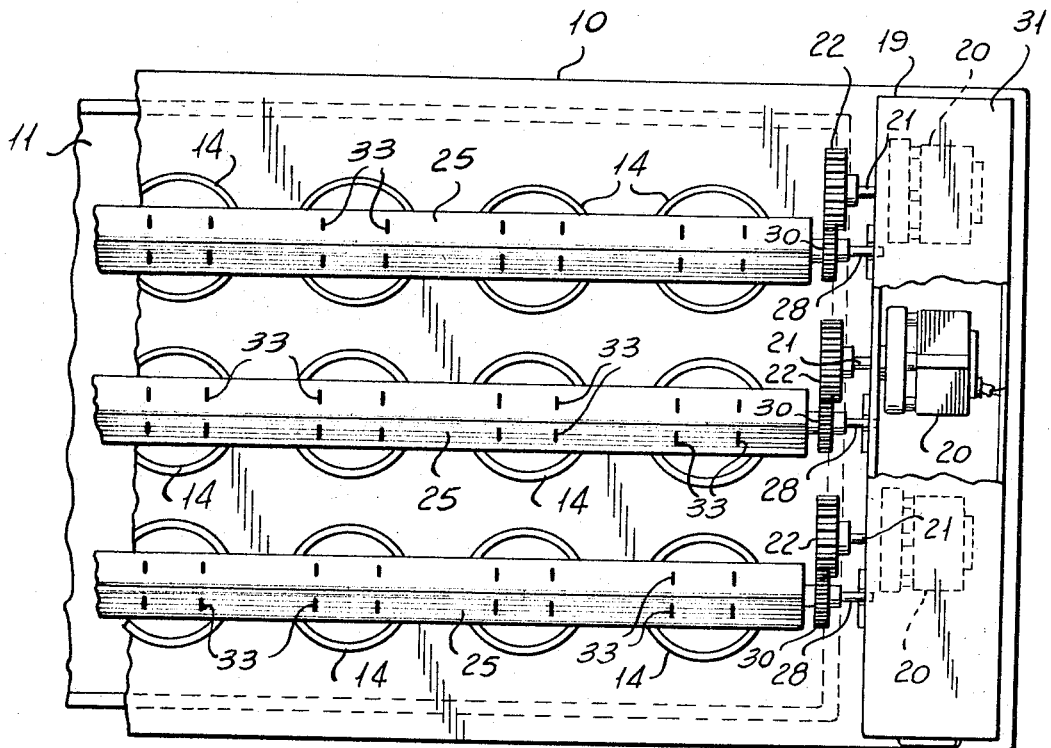

Referring to the drawings wherein like reference characters designate like parts throughout the several views:
FIGURE 1 is a perspective view of the apparatus;
FIGURE 2 is a side elevation, partly in section, of the apparatus;
FIGURE 3 is a sectional view taken on line 3—3 of FIGURE 2;
FIGURE 4 is a fragmentary top plan view of one end of the apparatus; and
FIGURE 5 is a detailed sectional view taken on line 5—5 of FIGURE 2.

As illustrated in the drawings, my invention comprises a base 10 which may be supported on a tank 11 and provided with a series of openings 13 in which are detachably mounted breakers 14 for containing dye solutions of different shades of color. One end of the base 10 is provided with an end wall 15 from which upwardly extends a plurality of brackets or standards 16 each having its upper end provided with a head 17 having a square-shaped opening 18.

The opposite end of the base 10 is equipped with a housing 19 in which is mounted a plurality of independently operated electric motors 20, each having a drive shaft 21 provided with a drive gear 22 and a switch 23 conecting the respective motor to an electrical power source by wiring 24. Disposed above the base 10 are three skein holding square-shaped shafts or bars 25 spaced from each other and having coincident ends provided with stub shafts 26 detachably journaled through elongated slots 27 in the wall 15.

The opposite ends of the bars 25 are provided with stub shafts 28 extending through elongated openings 29 in the housing 19 and equipped without the housing with gears 30 for meshing with the gears 22, the housing being provided with a removable cover 31 to facilitate removal of the bars. Each bar is provided with pairs of transverse markings 33 for denoting the position of each skein S in aligned relation with a beaker when the bar is detached from the head, lowered and the skein is immersed within the beaker.

It is to be noted that the tank 11 is provided with liquid constituting a constant temperature bath B into which the beakers extend, whereby the solutions in the beakers are maintained at a uniform temperature so essential in comparative dye testing. Furthermore, it is to be understod that the skeins of yarn may all be subjected to identical treatment, as to time and travel, in the dye solutions to obtain accurate comparison and evaluation with the shades of the standards. Moreover, it will be apparent that my apparatus is adaptable for the dyeing of skeins of various types of fibers including cotton, silk, wool, and artificial silks and for use with various types of dyes.

In use, assuming the beakers have been provided with solutions of different shades of a selected color, the bars are positioned with coincident ends disposed within the openings 18 of the heads 17, respectively, as illustrated in dotted lines in FIGURE 2. When the bars are thus positioned, the skeins are arranged thereon and suspended therefrom between the markings 33, whereupon the bars are removed from the heads 17 and lowered toward the base with the skeins being immersed into the solutions contained in the beakers. As the bars are lowered, the stub shafts 26 and 28 are disposed in the slots 27 and 29 of the wall and housing, respectively, with the gears 30 being laterally disposed in mesh with the gears 22.

When the bars are thus positioned, the motors are energized and effect rotation of the bars with the result that the skeins travel through the solutions in the beakers at a constant and uniform speed for a predetermined length of time. The bars are then disassembled from the base, the skeins removed therefrom, dried and then compared with the selected standard shade for evaluation, thereby enabling the operator to select the proper and correct shade of color for use in mixing a dye bath of a dye jigger or the like.

In actual reduction to practice, it has been found that square-shaped stainless steel bars are preferable for holding the skeins inasmuch as they effect constant travel of the skeins through the solutions without slippage of the skeins relative to the bars, thereby enabling the skeins to travel through the solutions in a constant and uniform speed for preestablished periods and to preclude discoloration by other metals, etc. This feature of my invention, it is believed, clearly distinguishes it from any prior art apparatus so far as I am aware. Furthermore, by positioning the skeins on the bars at designated distances from each other, as indicated by the markings 33, economy of time is obtained in the overall operation of the apparatus.

Without further elaboration, the foregoing will so fully explain the invention that others may, by applying current knowledge, readily adapt the same for use under various conditions of service. Moreover, it is not indispensable that all the features of the invention be used conjointly since they may be employed advantageously in various combinations and subcombinations.

It is obvious that the invention is not confined solely to the use herein disclosed in connection therewith as it may be utilized for any purpose to which it is adaptable. It is, therefore, to be understood that the invention is not limited to the specific construction as illustrated and described, as the same is only illustrative of the principles involved which are capable of extended application in various forms, and the invention comprehends all construction within the scope of the appended claims. It is to be understood that the language used herein and in the claims is intended to cover all the generic and specific features of the invention herein described, and all statements of the scope of the invention which, as a matter of language, may be said to fall therebetween.

What I claim is:

1. A dye testing apparatus comprising a base, beakers supported from the base for containing dye solutions of different shades, an upstanding wall on one end of the base, a housing on the opposite end of the base, a plurality of motors enclosed within the housing and spaced apart lengthwise thereof, bars extending in bridging relation over the beakers between the wall and housing and journaled therein for turning movement, and means operatively connecting the respective motors with the adjacent bars for rotating the bars.

2. A dye testing apparatus according to claim 1, wherein the wall and housing have upright slots therein slidably receiving the end portions of the bars and extending to the upper edges thereof for vertical withdrawal of the bars therefrom.

3. A dye testing apparatus according to claim 1, wherein the beakers are disposed in rows beneath the respective plurality of bars.

4. A dye testing apparatus according to claim 1, including bar supports carried by the wall and extending upwardly therefrom, each of the bar supports having a head thereon with a lateral opening to receive and support one of the bars above the base when the bars are removed from the wall and housing.

References Cited

UNITED STATES PATENTS

| 439,473 | 10/1890 | Campbell | 68—147 |
| 650,442 | 5/1900 | Stelter | 68—161 X |
| 872,597 | 12/1907 | Waters | 68—149 |
| 1,820,385 | 8/1931 | Farquhar et al. | 68—27 |
| 2,072,323 | 3/1937 | Wentz | 68—147 |
| 3,126,725 | 3/1964 | Parker et al. | 68—27 |

FOREIGN PATENTS

| 2,986 | 12/1900 | Austria. |
| 8,360 | 7/1902 | Austria. |
| 790,638 | 9/1935 | France. |
| 422,315 | 11/1925 | Germany. |

IRVING BUNEVICH, *Primary Examiner.*